United States Patent
Sugiyama (10) Patent No.: US 11,725,547 B2
(45) Date of Patent: Aug. 15, 2023

(54) VALVE OPENING AND CLOSING TIMING CONTROL APPARATUS DEVICE

(71) Applicant: AISIN CORPORATION, Aichi (JP)

(72) Inventor: Shuhei Sugiyama, Kariya (JP)

(73) Assignee: AISIN CORPORATION, Aichi (JP)

(*) Notice: Subject to any disclaimer, the term of this patent is extended or adjusted under 35 U.S.C. 154(b) by 0 days.

(21) Appl. No.: 17/701,202

(22) Filed: Mar. 22, 2022

(65) Prior Publication Data
US 2022/0325642 A1 Oct. 13, 2022

(30) Foreign Application Priority Data
Apr. 7, 2021 (JP) ................. 2021-065217

(51) Int. Cl.
*F01L 1/352* (2006.01)
*F02D 13/02* (2006.01)
*F01L 13/00* (2006.01)

(52) U.S. Cl.
CPC ......... *F01L 1/352* (2013.01); *F01L 2013/103* (2013.01); *F01L 2013/111* (2013.01); *F01L 2201/00* (2013.01); *F01L 2800/03* (2013.01); *F01L 2800/14* (2013.01); *F01L 2820/032* (2013.01); *F01L 2820/041* (2013.01); *F02D 2013/0292* (2013.01)

(58) Field of Classification Search
CPC ............... F01L 1/352; F01L 2013/103; F01L 2013/111; F01L 2201/00; F01L 2800/03; F01L 2800/14
USPC ............................ 123/90.15, 90.17
See application file for complete search history.

(56) References Cited

U.S. PATENT DOCUMENTS

| | | | |
|---|---|---|---|
| 2010/0180844 A1 | 7/2010 | Uehama et al. | |
| 2012/0247411 A1* | 10/2012 | Stewart | F01L 1/34 123/90.17 |
| 2018/0066549 A1* | 3/2018 | Kishimoto | F01L 1/344 |
| 2021/0062690 A1* | 3/2021 | Stewart | F02D 13/08 |
| 2022/0042426 A1* | 2/2022 | Kurisu | F16C 19/163 |

FOREIGN PATENT DOCUMENTS

DE 102020109268 A1 * 10/2020
JP 2009013975 A 1/2009

* cited by examiner

*Primary Examiner* — Jorge L Leon, Jr.
(74) *Attorney, Agent, or Firm* — Buchanan Ingersoll & Rooney PC (57) ABSTRACT

A valve opening and closing timing control device includes a driving-side rotating body, a driven-side rotating body, a stopper configured to determine a mechanical limit of a displacement region of a relative rotation phase, a phase control mechanism configured to change the relative rotation phase, and a control unit configured to control the electric motor so as to displace the actual phase detected by a phase sensor. A limit phase at which the stopper reaches an abutting state is set in advance when rotation of the electric motor is stopped while the internal combustion engine operates. Upon executing stop control of stopping the internal combustion engine, except when the actual phase is already the limit phase, the control unit executes braking control of limiting the rotation of the electric motor by controlling an electric current to be supplied to the electric motor.

5 Claims, 6 Drawing Sheets

VALVE OPENING AND CLOSING TIMING CONTROL APPARATUS DEVICE

CROSS REFERENCE TO RELATED APPLICATIONS

This application is based on and claims priority under 35 U.S.C. § 119 to Japanese Patent Application 2021-065217, filed on Apr. 7, 2021, the entire content of which is incorporated herein by reference.

TECHNICAL FIELD

This disclosure relates to a valve opening and closing timing control device.

BACKGROUND DISCUSSION

JP 2009-013975A (Reference 1) discloses a valve opening and closing timing control device (referred to as a valve timing adjustment device in the reference), which is provided on at least one camshaft of an intake valve and an exhaust valve of an internal combustion engine, and adjusts a valve timing by energizing an electric motor to adjust a relative phase between a crank shaft and the cam shaft by a motor torque generated in a motor shaft of the electric motor.

Reference 1 discloses a configuration in which the motor torque of the electric motor is balanced with a magnetic holding torque of the electric motor and a cam torque of the cam shaft after the internal combustion engine is stopped.

In a valve opening and closing timing control device including a driving-side rotating body that is configured to rotate in synchronization with rotation of a crankshaft, a driven-side rotating body that is configured to rotate integrally with a camshaft, and a phase control mechanism that is configured to control a relative rotation phase of the rotating bodies by a driving force of an electric motor, it is possible to set the relative rotation phase to any phase under the control of the electric motor.

In the valve opening and closing timing control device, a cam fluctuation torque acts from the camshaft in a situation where the internal combustion engine operates. Since the cam fluctuation torque acts in this way, a rotation speed (angular velocity) of the camshaft fluctuates (increases or decreases) during one rotation, a fluctuation range of this angular velocity tends to increase as the rotation speed of the internal combustion engine decreases. The valve opening and closing timing control device includes stoppers that determine a mechanical limit of a relative displacement (relative rotation phase) between the driving-side rotating body and the driven-side rotating body.

The cam fluctuation torque of the camshaft tends to greatly change the relative rotation phase between the driving-side rotating body and the driven-side rotating body as the rotation speed (the number of rotations per unit time) of the crankshaft decreases. Thus, when the internal combustion engine is stopped, the stoppers may repeatedly abut each other within a short period of time as the rotation speed decreases, leading to the generation of collision noises, and it is also concerned that teeth of gears constituting the phase control mechanism may be damaged.

A need thus exists for a valve opening and closing timing control device which is not susceptible to the drawback mentioned above.

SUMMARY

A characteristic configuration of a valve opening and closing timing control device according to this disclosure includes: a driving-side rotating body that is configured to rotate in synchronization with a crankshaft of an internal combustion engine; a driven-side rotating body that is configured to rotate integrally with a camshaft for opening and closing a valve in a combustion chamber of the internal combustion engine and is arranged coaxially with a rotation shaft core of the driving-side rotating body; a stopper that is configured to determine a mechanical limit of a displacement region of a relative rotation phase between the driving-side rotating body and the driven-side rotating body; a phase control mechanism that has a gear-type transmission structure configured to maintain the relative rotation phase by driving and rotating with an electric motor at a rotation speed equal to a rotation speed of the driving-side rotating body, and to change the relative rotation phase by driving and rotating with the electric motor at a rotation speed different from the rotation speed of the driving-side rotating body; a phase sensor that is configured to detect the relative rotation phase as an actual phase; and a control unit that is configured to control the electric motor so as to displace the actual phase detected by the phase sensor in a direction toward a target phase, in which a limit phase at which the stopper reaches an abutting state is set in advance when rotation of the electric motor is stopped while the internal combustion engine operates, and upon executing stop control of stopping the internal combustion engine, except when the actual phase detected by the phase sensor is already the limit phase, the control unit executes braking control of limiting the rotation of the electric motor by controlling an electric current to be supplied to the electric motor.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to the drawings.

Basic Configuration

Figure 1:
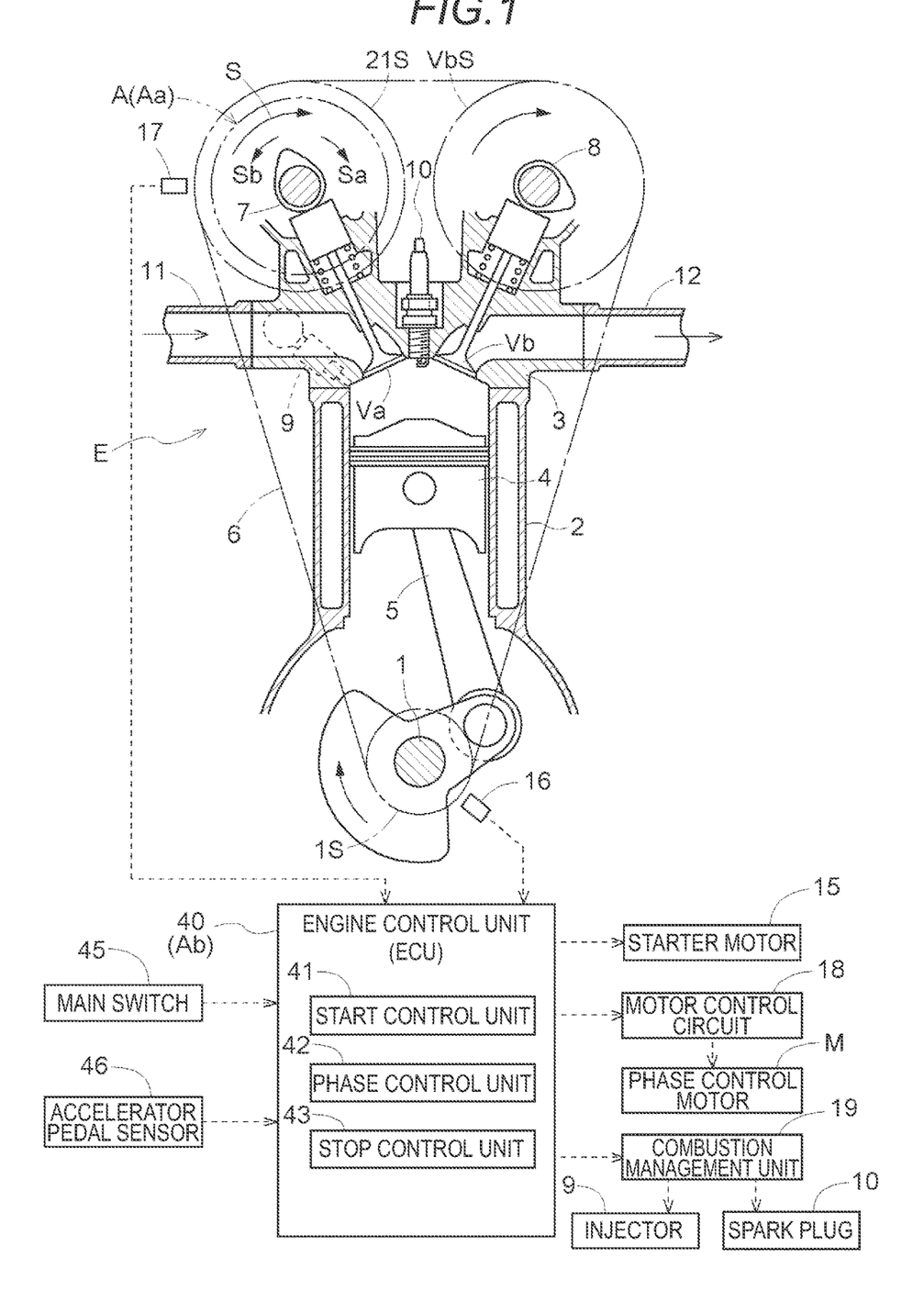
FIG. 1 is a diagram illustrating a cross section and a control device of an engine.

As illustrated in FIG. 1, an engine E as an internal combustion engine includes an intake valve Va and an exhaust valve Vb, and includes a valve opening and closing timing control device A capable of controlling a valve timing (opening and closing timing) of the intake valve Va. This engine E (an example of the internal combustion engine) is provided in a vehicle in order to obtain a traveling driving force for a passenger car or the like.

Engine

Figure 2:
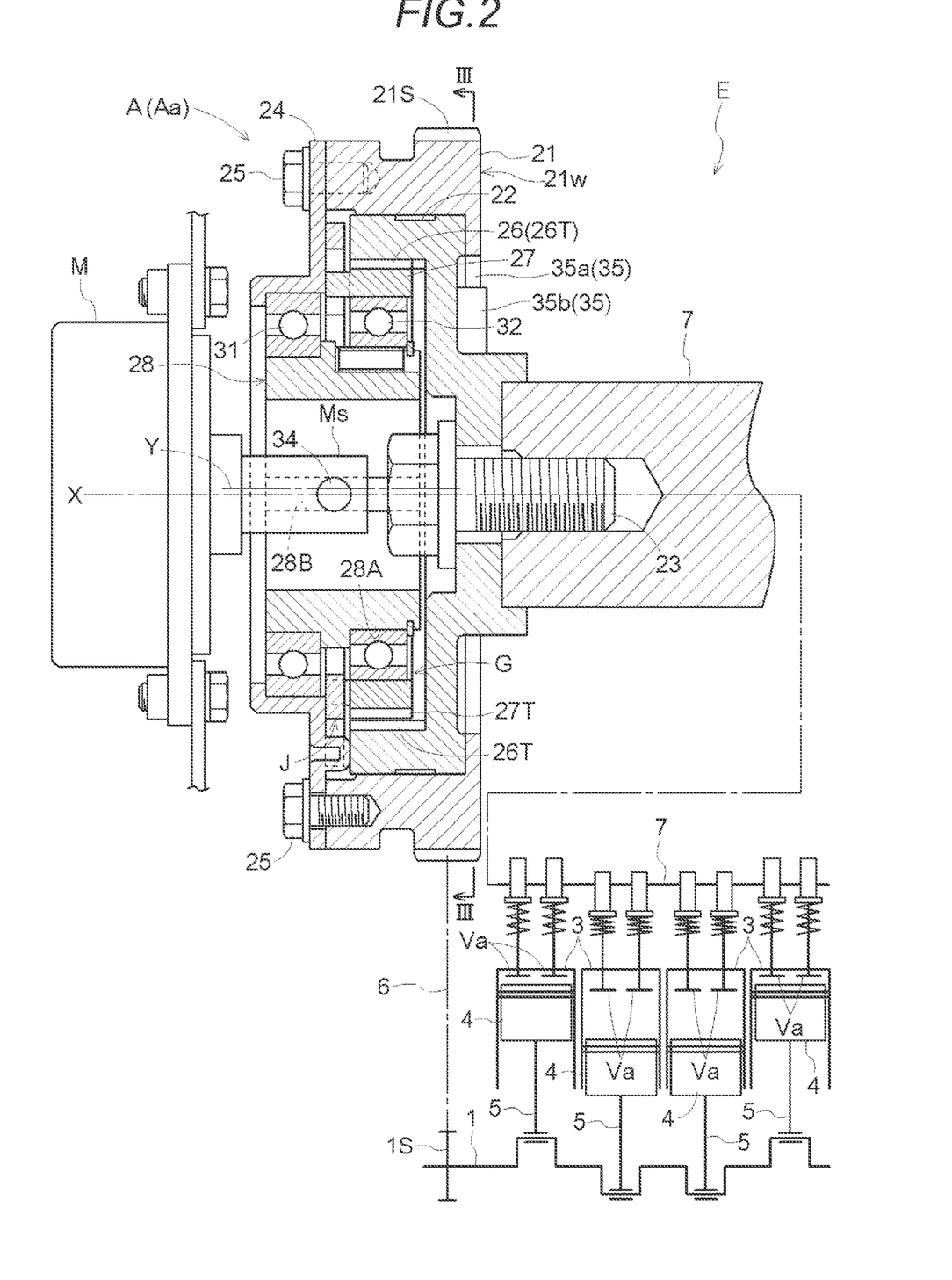
FIG. 2 is a cross-sectional view of an operating body of a valve opening and closing timing control device.

As illustrated in FIGS. 1 and 2, the engine E is configured as a 4-cycle type in which a cylinder head 3 is connected to an upper portion of a cylinder block 2 that supports a crankshaft 1, a piston 4 is housed to be reciprocally operable in a plurality of cylinder bores of the cylinder block 2, and the piston 4 is connected to the crankshaft 1 via a connecting rod 5.

The cylinder head 3 includes the intake valve Va and the exhaust valve Vb, and an intake camshaft 7 (an example of a camshaft) that controls the intake valve Va and an exhaust camshaft 8 (an example of the camshaft) that controls the exhaust valve Vb are provided on an upper portion of the cylinder head 3. A timing belt 6 is wound around an output pulley 1S of the crankshaft 1, a drive pulley 21S of an operating body Aa of the valve opening and closing timing control device A, and an exhaust pulley VbS of the exhaust valve Vb.

The cylinder head 3 includes an injector 9 for injecting fuel into a combustion chamber and a spark plug 10. The cylinder head 3 is connected to an intake manifold 11 that supplies air to the combustion chamber via the intake valve Va and an exhaust manifold 12 that sends out combustion gas from the combustion chamber via the exhaust valve Vb.

As illustrated in FIGS. 1 and 2, the engine E includes a starter motor 15 that drives and rotates the crankshaft 1, a crank angle sensor 16 capable of detecting a rotation angle provided at a position near the crankshaft 1, and a cam angle sensor 17 capable of detecting a rotation angle of the intake camshaft 7 provided near the intake camshaft 7. In particular, the crank angle sensor 16 and the cam angle sensor 17 constitute a phase sensor that detects a relative rotation phase as an actual phase.

The crank angle sensor 16 and the cam angle sensor 17 are configured as a pickup type that intermittently outputs a pulse signal along with the rotation. The crank angle sensor 16 acquires the rotation angle from a rotation reference by counting the pulse signal from the rotation reference of the crankshaft 1 when the crankshaft 1 rotates. Similarly, the cam angle sensor 17 acquires the rotation angle from the rotation reference by counting the pulse signal from the rotation reference of the intake camshaft 7 when the intake camshaft 7 rotates.

Since the crank angle sensor 16 and the cam angle sensor 17 are provided, for example, by storing in advance a count value of the crank angle sensor 16 and a count value of the cam angle sensor 17 in a state where a driving case 21 and an internal rotor 22 are in a predetermined reference phase (for example, an intermediate phase), it is possible to use, by comparing two types of count values, the crank angle sensor 16 and the cam angle sensor 17 as the phase sensor that acquires the relative rotation phase as the actual phase even when the relative rotation phase is displaced from a reference phase to either an advanced side or a retarded side.

The engine E is controlled by an engine control unit 40 (an example of a control unit). The engine control unit 40 is configured as an ECU that controls the engine E, and includes, as a control unit Ab, a start control unit 41, a phase control unit 42, and a stop control unit 43. The details of the control of the engine control unit 40 will be described later.

Valve Opening and Closing Timing Control Device

The valve opening and closing timing control device A includes the operating body Aa including hardware that determines the valve timing of the intake valve Va by a driving force of a phase control motor M (an example of an electric motor) and the control unit Ab including software, i.e., the above-described engine control unit 40 for controlling the phase control motor M.

Figure 3:
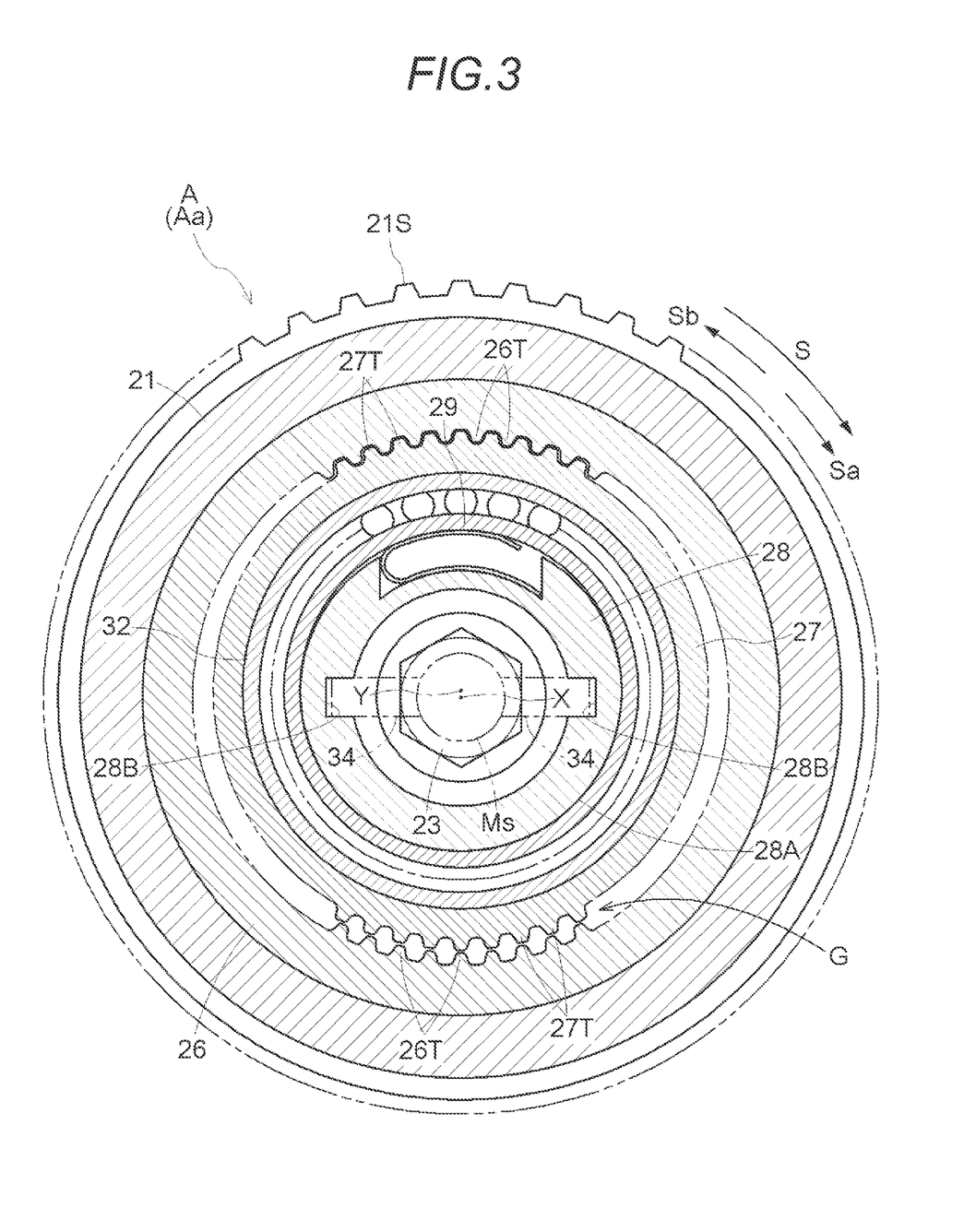
FIG. 3 is a cross-sectional view taken along a line III-III in FIG. 2.

As illustrated in FIGS. 2 and 3, the operating body Aa of the valve opening and closing timing control device A includes the driving case 21 (an example of a driving-side rotating body), the internal rotor 22 (an example of a driven-side rotating body), and a phase control mechanism G that changes a relative rotation phase between the driving case 21 and the internal rotor 22 (in the following description, may be simply referred to as "relative rotation phase") by the driving force of the phase control motor M (electric motor).

The relative rotation phase between the driving case 21 and the internal rotor 22 is a relative angle between the driving case 21 and the internal rotor 22 about a rotation shaft core X. By changing the relative rotation phase, the valve timing (opening and closing timing) of the intake valve Va changes.

Valve Opening and Closing Timing Control Device: Operating Body

As illustrated in FIGS. 2 and 3, in the operating body Aa, the driving case 21 (driving-side rotating body) and the internal rotor 22 (driven-side rotating body) are arranged in coaxially with the rotation shaft core X of the intake camshaft 7, and the phase control mechanism G controls the relative rotation phase by the driving force of the phase control motor M (electric motor).

The driving case 21 has the drive pulley 21S formed on an outer circumference thereof. The internal rotor 22 is included in the driving case 21 and is connected and fixed to the intake camshaft 7 via a connecting bolt 23. With this configuration, the driving case 21 is relatively rotatably supported on an outer circumferential portion of the internal rotor 22 that is supported in a connected state to the intake camshaft 7.

The phase control mechanism G is arranged between the driving case 21 and the internal rotor 22, and a front plate 24 is fastened via a plurality of fastening bolts 25 at positions covering an opening portion of the driving case 21. Accordingly, the displacement of the phase control mechanism G and the internal rotor 22 in a direction along the rotation shaft core X is regulated by the front plate 24.

As illustrated in FIGS. 1 and 3, the operating body Aa is entirely rotated in a driving rotation direction S by the driving force from the timing belt 6. The driving force of the phase control motor M is transmitted to the internal rotor 22 via the phase control mechanism G, whereby the relative rotation phase between the internal rotor 22 and the driving case 21 is displaced. Among the displacement, a displacement direction toward the direction same as the driving rotation direction S is referred to as an advance direction Sa, and the opposite direction is referred to as a retard direction Sb.

Valve Opening and Closing Timing Control Device: Phase Control Mechanism

As illustrated in FIGS. 2 and 3, the phase control mechanism G includes a ring gear 26 formed coaxially with the rotation shaft core X on an inner circumference of the internal rotor 22, an inner gear 27 rotatably arranged on an inner circumferential side of the internal rotor 22 coaxially with an eccentric shaft core Y, an eccentric cam body 28 arranged on an inner circumferential side of the inner gear 27, the front plate 24, and a joint portion J. The eccentric shaft core Y is formed in a posture parallel to the rotation shaft core X.

The ring gear 26 has a plurality of internal tooth portions 26T, the inner gear 27 has a plurality of external tooth portions 27T, and a part of the external tooth portions 27T mesh with the internal tooth portions 26T of the ring gear 26. This phase control mechanism G is configured as an inscribed planetary gear reducer in which the number of teeth of the external tooth portions 27T of the inner gear 27 is smaller than the number of teeth of the internal tooth portions 26T of the ring gear 26 by one tooth.

The joint portion J is configured as an Oldham joint type in which the inner gear 27 and the driving case 21 are integrally rotated while maintaining a positional relation in which the inner gear 27 is eccentric with respect to the driving case 21.

The eccentric cam body 28 has a cylindrical shape as a whole, and a pair of engaging grooves 28B are formed in a posture parallel to the rotation shaft core X with respect to the inner circumference. The eccentric cam body 28 is supported by a first bearing 31 with respect to the front plate 24 so as to rotate coaxially with the rotation shaft core X, and is formed with an eccentric cam surface 28A on an outer circumference at a portion on an intake camshaft 7 side from this support position.

As illustrated in FIGS. 2 and 3, the eccentric cam surface 28A is formed in a circular shape (cross-sectional shape is circular) centered on the eccentric shaft core Y in a posture parallel to the rotation shaft core X. The inner gear 27 is rotatably supported on the eccentric cam surface 28A via a second bearing 32. A spring body 29 is fitted in a recess formed in the eccentric cam surface 28A, and an urging force of the spring body 29 is configured to act on the inner gear 27 via the second bearing 32. With such a configuration, a part of the external tooth portions 27T of the inner gear 27 mesh with a part of the internal tooth portions 26T of the ring gear 26, and the meshing state is maintained by the urging force of the spring body 29.

The phase control motor M is supported by the engine E, and engaging pins 34 formed on an output shaft Ms are fitted in the engaging grooves 28B on the inner circumference of the eccentric cam body 28. The phase control motor M includes a rotor having a permanent magnet, a stator having a plurality of field coils Mc arranged at positions surrounding the rotor (see FIG. 6), and the output shaft Ms to which the rotation of the rotor is transmitted, so as to make a configuration as a brushless type having a structure common to that of a three-phase motor (three-phase energization motor).

In this valve opening and closing timing control device A, when the engine E operates, the relative rotation phase of the valve opening and closing timing control device A is maintained by driving and rotating the output shaft Ms in the driving rotation direction S at the same rotation speed as the driving case 21. By increasing or decreasing the rotation speed of the output shaft Ms of the phase control motor M with respect to the rotation speed of the driving case 21, it is possible to control the relative rotation phase to be changed to the advance direction Sa or the retard direction Sb.

Valve Opening and Closing Timing Control Device: Stopper

Figure 4:
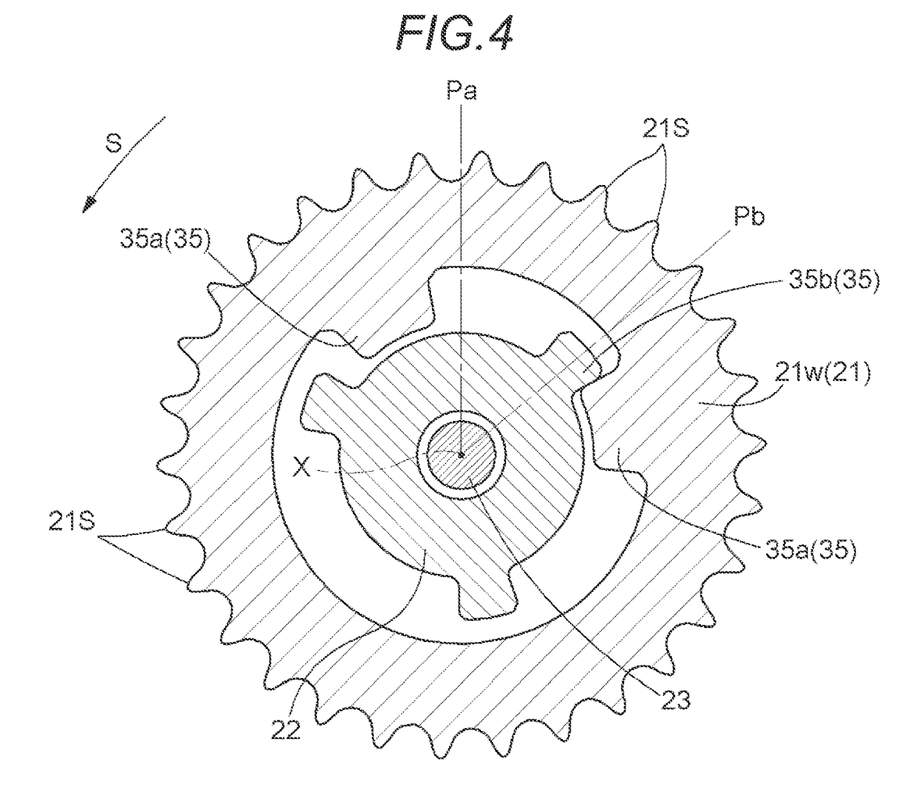
FIG. 4 is a cross-sectional view illustrating a structure of stoppers at a most retarded angle phase.
Figure 5:
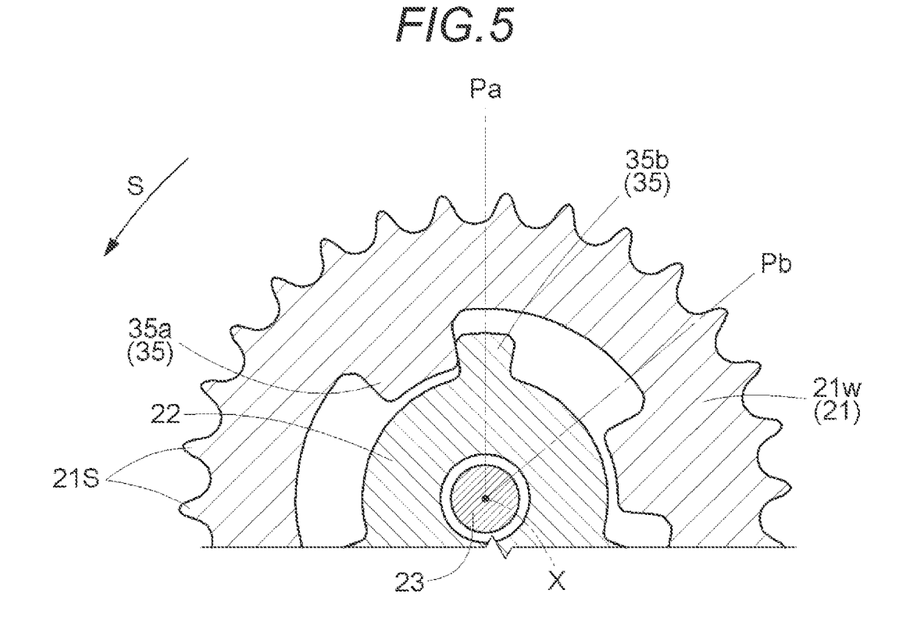
FIG. 5 is a cross-sectional view illustrating a structure of the stoppers at a most advanced angle phase.

In particular, the operating body Aa includes, as illustrated in FIGS. 2, 4 and 5, a stopper 35 including a pair of driving-side abutting portions 35a that rotate integrally with the driving case 21, and a driven-side abutting portion 35b that rotates integrally with the internal rotor 22.

That is, an opening is formed in a wall portion 21w on a side of the driving case 21 close to the intake camshaft 7, and the pair of driving-side abutting portions 35a projecting inward with respect to an inner circumference of the opening are formed. In a region of the internal rotor 22 that surrounds the intake camshaft 7, the driven-side abutting portion 35b projecting outward from the internal rotor 22 is formed with respect to a region housed in the opening of the wall portion 21w.

When the relative rotation phase reaches a mechanical limit between the advance direction Sa and the retard direction Sb, the stopper 35 restrains a phenomenon that the relative rotation phase is displaced to exceed the mechanical limit due to the abutting between the driving-side abutting portions 35a and the driven-side abutting portion 35b. As illustrated in FIG. 4, when the relative rotation phase is in a most retarded angle phase Pb, the driven-side abutting portion 35b abuts a corresponding one in the pair of driving-side abutting portions 35a. Similarly, when the relative rotation phase is in a most advanced angle phase Pa, as illustrated in FIG. 5, the driven-side abutting portion 35b abuts a corresponding one in the pair of driving-side abutting portions 35a.

Control Configuration

As illustrated in FIG. 1, the engine control unit 40 receives a detection signal from the crank angle sensor 16 and the cam angle sensor 17, and receives a detection signal from a main switch 45 and an accelerator pedal sensor 46. Further, the engine control unit 40 outputs a control signal to the starter motor 15, a motor control circuit 18, and a combustion management unit 19.

In this configuration, the main switch 45 is arranged on a panel portion of a driver's seat of a vehicle, and enables the engine E to be started by a human operation and completely stopped by the human operation. The accelerator pedal sensor 46 detects a depression amount of an accelerator pedal (not illustrated).

The starter motor 15 drives the crankshaft 1 when the engine E is started. The motor control circuit 18 controls the rotation of the phase control motor M. The combustion management unit 19 manages operations of pumps that supply fuel to the injector 9, and also manages a firing order and a spark timing by controlling a spark circuit that supplies electric power to the spark plug 10.

As described above, the engine control unit 40 includes the start control unit 41, the phase control unit 42, and the stop control unit 43. These units are configured as software, but it is also possible to configure a part of these units with hardware.

The start control unit 41 operates the starter motor 15 to control the combustion management unit 19 to start the engine E which is in a stopped state. The phase control unit 42 basically controls the phase control motor M so as to displace the actual phase detected by the phase sensor (crank angle sensor 16 and cam angle sensor 17) toward a target phase in the situation where the engine E operates. The stop control unit 43 automatically stops the engine E when a stop condition is satisfied as in idle stop control, and completely stops the engine E based on a human operation with the main switch 45.

In particular, according to this stop control unit 43, with a cam fluctuation torque acting on the intake camshaft 7 in the process of stopping the engine E, an impact noise caused by the abutting between the driving-side abutting portions 35a and the driven-side abutting portion 35b of the stopper 35 is reduced, and control to reduce damage to the internal tooth portions 26T and the external tooth portions 27T of the phase control mechanism G is also executed.

The stop control unit 43 performs stop control of automatically stopping the engine E and stop control of stopping the engine E by the human operation. In the case of stopping the engine E, the stop control unit 43 sets the relative rotation phase of the operating body Aa of the valve opening and closing timing control device A to the most retarded angle phase Pb.

Figure 6:
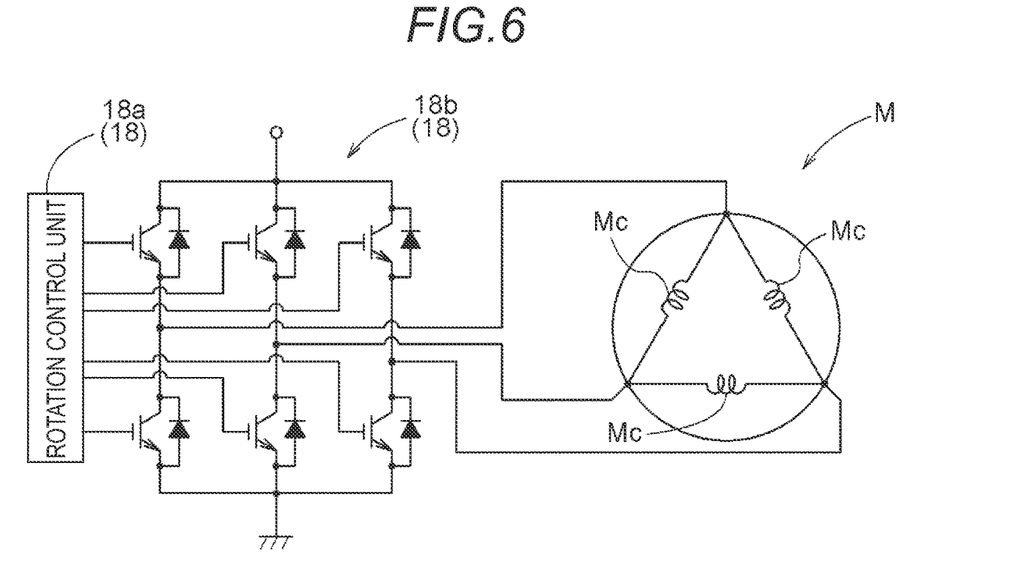
FIG. 6 is a circuit diagram of a motor control circuit and a field coil.

As described above, the phase control motor M is configured as a brushless type having the structure same as the three-phase motor. As illustrated in FIG. 6, the motor control circuit 18 includes a rotation control unit 18a that controls the rotation of the phase control motor M, and a driver circuit 18b that supplies an electric current to the field coils Mc of the phase control motor M.

Control Form

The rotation speed of the intake camshaft 7 of the engine E fluctuates in a short cycle in a speed increasing direction and a speed decreasing direction due to the action of the cam fluctuation torque when the engine E operates. Thus, the relative rotation phase between the internal rotor 22 connected to the intake camshaft 7 and the driving case 21 also fluctuates in a short cycle in the advance direction Sa and the retard direction Sb. An amplitude of the cam fluctuation torque (angle of fluctuation between the advance direction Sa and the retard direction Sb) tends to increase as the rotation speed (the number of rotations per unit time) of the crankshaft 1 decreases.

Therefore, in the case of stopping the engine E, the amplitude of the torque fluctuation acting on the internal rotor 22 increases as the rotation speed of the crankshaft 1 decreases, and the abutting and separation between the driving-side abutting portions 35a and the driven-side abutting portion 35b of the stopper 35 are repeatedly performed. As a result, a collision noise may be generated during the abutting, or a strong force may be applied to a portion where the internal tooth portions 26T and the external tooth portions 27T of the phase control mechanism G mesh with each other, resulting in damage.

Figure 8:
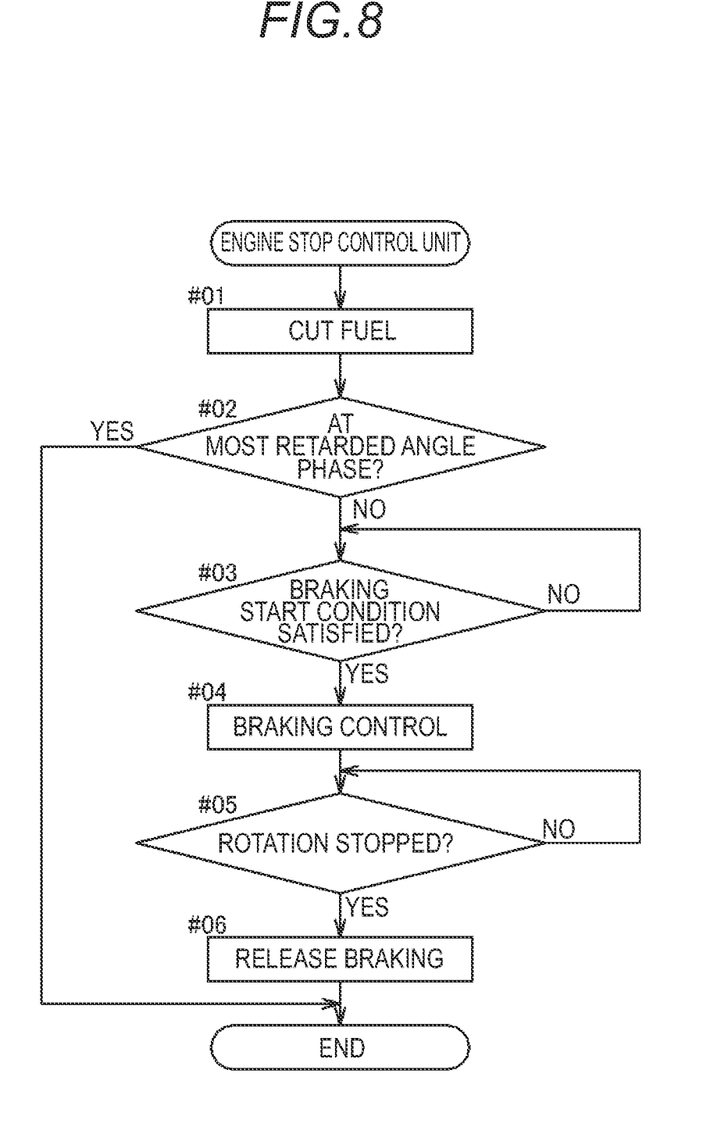
FIG. 8 is a flowchart of engine stop control.

For this reason, in the case of stopping the engine E, the engine control unit 40 reduces the fluctuation of the rotation speed of the relative rotation phase due to the action of the cam fluctuation torque by executing engine stop control illustrated in a flowchart in FIG. 8. In the engine stop control, braking control is executed to stop the rotation of the output shaft Ms of the phase control motor M by one-phase energization that supplies the electric current only to one phase of the field coils Mc of the phase control motor M illustrated in FIG. 6, and by executing the braking control in this way, the relative rotation phase is shifted to the most retarded angle phase Pb at the time when the engine E is stopped. This braking control is a specific example of control of limiting the rotation of the phase control motor M by controlling the electric current to be supplied to the phase control motor M (electric motor).

The engine stop control is similarly performed in both cases of the complete stop of the engine E by the human operation with the main switch 45 and the stop of the engine E by the idle stop when the accelerator pedal is released.

Figure 7:
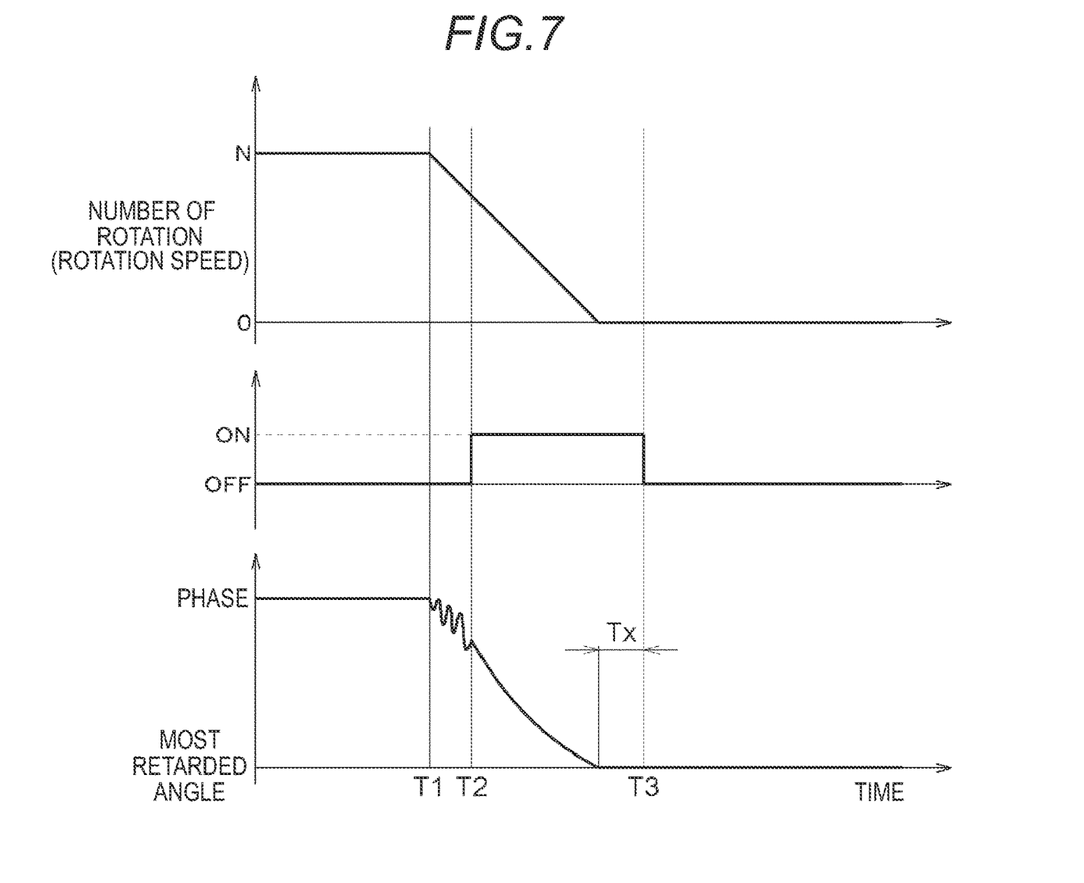
FIG. 7 is a timing chart illustrating the number of rotations of the engine, a timing of braking control, and a relative rotation phase.

FIG. 7 illustrates a timing chart in which the rotation speed of the crankshaft 1 is shown in the upper stage, the execution and stop of the braking control are shown by ON-OFF in the middle stage, and the relative rotation phase of the valve opening and closing timing control device A is shown in the lower stage. As illustrated in FIG. 7, when the engine stop control is executed at a stop control start timing T1, the rotation speed (referred to as the number of rotations in FIG. 7) of the crankshaft 1 decreases, and the braking control is executed at a braking start timing T2 in the process of this decrease.

As illustrated in FIG. 7, after executing the engine stop control at the stop control start timing T1, in a state where the relative rotation phase fluctuates due to the action of the cam fluctuation torque, the relative rotation phase starts to displace toward the most retarded angle phase Pb, and the braking control is executed. Whereby, the relative rotation phase reaches the most retarded angle phase Pb by an offset timing Tx earlier than a stop timing T3 at which the rotation of the crankshaft 1 is completely stopped after the fluctuation of the relative rotation phase is reduced.

It can be imagined that when the time from the stop control start timing T1 to the stop timing T3 is extremely short, the relative rotation phase does not reach the most retarded angle phase Pb at the stop timing T3. In such a case, it is also conceivable to control the relative rotation phase to be set to the most retarded angle phase Pb by driving the phase control motor M after the engine E is stopped (after reaching the stop timing T3).

When executing the engine stop control illustrated in the flowchart in FIG. 8, under the control of the combustion management unit 19, the fuel is cut to stop the fuel supply from the injector 9 to the combustion chamber (step #01). Then, except when the relative rotation phase is the most retarded angle phase Pb (an example of a limit phase) (Yes in step #02), when the relative rotation phase is not the most retarded angle phase Pb (No in step #02), it is determined that a braking start condition is satisfied (step #03).

The braking start condition includes that at least one of the following cases is satisfied: a case where the rotation speed (the number of rotations per unit time) of the crankshaft 1 detected by the crank angle sensor 16 has decreased below a set value, and a case where a speed at which the driving-side abutting portions 35a and the driven-side abutting portion 35b of the stopper 35 abut each other due to the action of the cam fluctuation torque acting from the intake camshaft 7 has exceeded a set value. The set value of the rotation speed of the crankshaft 1 is stored in advance in the engine control unit 40.

The speed at which the driving-side abutting portions 35a and the driven-side abutting portion 35b abut each other is not actually measured, the speed is obtained based on a reason that the speed during the abutting becomes faster as the displacement amount that the relative rotation phase is displaced toward the advance side is larger with respect to the most retarded angle phase Pb as a reference, and the braking start condition is also satisfied when the displacement amount to the advance side expands to exceed the set value. The set value of the displacement amount to the advance side is stored in advance in the engine control unit 40.

When the braking start condition is satisfied in this way (Yes in step #03), a braking force is applied to the output shaft Ms by the braking control (step #04) of supplying the electric current only to one phase of the field coils Mc of the phase control motor M. The timing at which the braking force is applied to execute the braking control is the braking start timing T2.

In the engine stop control, as illustrated in FIG. 4, when the relative rotation phase is the most retarded angle phase Pb (limit phase) (Yes in step #02), since the driving-side abutting portions 35a and the driven-side abutting portion 35b already abut each other, the braking force is not applied and the engine stop control ends.

In the braking control of step #04, the one-phase energization of supplying the electric current to only one phase of the field coils Mc continues until the rotation of the crankshaft 1 is stopped. When the rotation of the crankshaft 1 is stopped (Yes in step #05), the one-phase energization is stopped and the engine stop control ends.

According to this control, two types of braking start conditions are set, and braking is started when any one of the conditions is satisfied. Alternatively, the control form may be set such that the braking control is executed based on only one condition, or the braking control may be executed only when both conditions are satisfied.

Effect of Embodiment

In this way, as a result of applying the braking force to the output shaft Ms of the phase control motor M (electric motor) of the valve opening and closing timing control device A by the braking control to reduce the fluctuation of the relative rotation phase of the valve opening and closing timing control device A by executing the engine stop control in the case of stopping the engine E (internal combustion engine), the generation of the collision noise in the stopper 35 is reduced, and the damage of the internal tooth portions 26T and the external tooth portions 27T of the phase control mechanism G is reduced in a quiet manner.

At a time when the engine E is stopped, the relative rotation phase of the valve opening and closing timing control device A reaches the most retarded angle phase Pb, and thus, when the crankshaft 1 is driven and rotated by the starter motor 15 when the engine E is started next time, so-called cranking in the decompressed state may occur, and the rotation speed of the crankshaft 1 is increased in a short time to improve the starting performance.

Further, when the relative rotation phase has already reached the most retarded angle phase Pb (the stopper 35 is in the abutting state) when the engine stop control is started, the braking control is not performed because the phenomenon of the fluctuation of the relative rotation phase is restrained. Thus, in a situation where the relative rotation phase has already reached the most retarded angle phase Pb, as in the case where the rotation of the output shaft Ms of the phase control motor M is stopped, a side effect that a strong force acts on the meshing portion between the internal tooth portions 26T of the ring gear 26 and the external tooth portions 27T of the inner gear 27 of the phase control mechanism G is eliminated, heat generation due to the electric current flowing through the field coils Mc is reduced, and wasteful electric power consumption is reduced.

With this configuration, the braking force is obtained by controlling the electric current to be supplied to the phase control motor M, and thus, it is sufficient to use control of supplying the electric current to the field coils Mc of the phase control motor M, and it is not necessary to provide a braking member or the like in order to apply the braking force.

Other Embodiments

This disclosure may be constituted as follows in addition to the embodiment described above (those having the same functions as those in the embodiment are denoted by the same reference numerals and signs as those in the embodiment).

(a) As a control form in which the braking force is applied from the phase control motor M (electric motor), the phase control motor M having the configuration described in the embodiment performs two-phase electric power feeding to supply an electric current to two phases of the three-phase coils. By performing such control, it is possible to apply a strong braking force to the output shaft Ms of the phase control motor M.

(b) It is not limited to completely stop the rotation of the phase control motor M in the case of applying the braking force from the phase control motor M (electric motor). For example, a braking form is set such that the rotation of the output shaft Ms is intermittently stopped and the braking force is applied by energizing one phase (or two phases) of the field coils Mc in a short cycle.

In this braking form, the braking force can be substantially adjusted by adjusting a duty ratio, and the required braking force can also be obtained.

(c) It is not limited to the valve opening and closing timing control device A provided in the intake camshaft 7 as described in the embodiment, and a configuration may be such that when the stop control of the engine E provided with the valve opening and closing timing control device A on the exhaust camshaft 8 is executed, the braking force is applied from the output shaft Ms of the phase control motor M.

(d) Except when the engine stop control is started and the relative rotation phase is the limit phase, the control form is set such that the braking control is started at the timing when the set time (for example, 0.1 second) has elapsed from the start of the stop control. According to the control, the stop condition described in the embodiments is satisfied at the timing when the set time has elapsed, and the braking control can be executed even when it takes time to satisfy the braking condition described in the embodiments.

INDUSTRIAL APPLICABILITY

This disclosure can be used for a valve opening and closing timing control device.

A characteristic configuration of a valve opening and closing timing control device according to this disclosure includes: a driving-side rotating body that is configured to rotate in synchronization with a crankshaft of an internal combustion engine; a driven-side rotating body that is configured to rotate integrally with a camshaft for opening and closing a valve in a combustion chamber of the internal combustion engine and is arranged coaxially with a rotation shaft core of the driving-side rotating body; a stopper that is configured to determine a mechanical limit of a displacement region of a relative rotation phase between the driving-side rotating body and the driven-side rotating body; a phase control mechanism that has a gear-type transmission structure configured to maintain the relative rotation phase by driving and rotating with an electric motor at a rotation speed equal to a rotation speed of the driving-side rotating body, and to change the relative rotation phase by driving and rotating with the electric motor at a rotation speed different from the rotation speed of the driving-side rotating body; a phase sensor that is configured to detect the relative rotation phase as an actual phase; and a control unit that is configured to control the electric motor so as to displace the actual phase detected by the phase sensor in a direction toward a target phase, in which a limit phase at which the stopper reaches an abutting state is set in advance when rotation of the electric motor is stopped while the internal combustion engine operates, and upon executing stop control of stopping the internal combustion engine, except when the actual phase detected by the phase sensor is already the limit phase, the control unit executes braking control of limiting the rotation of the electric motor by controlling an electric current to be supplied to the electric motor.

According to this characteristic configuration, upon executing the stop control, except when the actual phase detected by the phase sensor is already the limit phase, even in a situation where a cam torque acting on the driven-side rotating body from the camshaft fluctuates greatly by performing the braking control of limiting the rotation of the electric motor by controlling the electric current to be supplied to the electric motor, this fluctuation can be reduced by limited rotation of the electric motor by the braking control, and a fluctuation of the relative rotation phase can be reduced. Since the fluctuation of the relative rotation phase is reduced in this way, the stopper does not repeatedly reach the abutting state within a short period of time, and does not exert a strong impact force on teeth of gears constituting the phase control mechanism.

When the actual phase detected by the phase sensor is already the limit phase, since the stopper is in the abutting state, a phenomenon that the relative rotation phase fluctuates greatly due to the cam torque is restrained, so that it is not necessary to perform the braking control and there is no wasteful electric power consumption.

Thus, a valve opening and closing timing control device that is quiet and does not cause damage to gears or the like when stopping the internal combustion engine is configured.

As a configuration in addition to the above-described configuration, after starting the stop control, the control unit may start the braking control when it is determined that the number of rotations of the driving-side rotating body in a unit time has decreased below a set value.

According to this configuration, for example, by setting the number of rotations, at which a fluctuation range of the cam torque expands, to a reference value for starting the braking control, unnecessary braking control is not performed.

As a configuration in addition to the above-described configuration, after starting the stop control, the control unit may start the braking control when it is determined that a speed of abutting portions of the stopper has exceeded a set speed when the abutting portions collide with each other due to a torque acting from the camshaft.

According to this configuration, by setting the value of the speed when the abutting portions of the stopper collide with each other to the reference value for starting the braking control, a phenomenon that the abutting portions of the stopper collide with each other at a high speed can be reduced and the impact can be restrained.

As a configuration in addition to the above-described configuration, in the braking control, the rotation of the electric motor may be stopped by controlling the electric current to be supplied to the electric motor, after starting the stop control.

According to this configuration, it is possible to perform the braking control only by controlling the electric current to be supplied to the electric motor, and the control can be executed extremely simply.

As a configuration in addition to the above-described configuration, the electric motor may be a three-phase energization electric motor, and in the braking control, control of the electric current to be supplied to the electric motor may be performed by energizing only one of three phases of the electric motor.

According to this configuration, by energizing only one phase, a rotor of the electric motor does not rotate, and a braking force of an output shaft can be applied.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A valve opening and closing timing control device, comprising:
    a driving-side rotating body configured to rotate in synchronization with a crankshaft of an internal combustion engine;
    a driven-side rotating body configured to rotate integrally with a camshaft of the internal combustion engine so as to open and close a valve in a combustion chamber of the internal combustion engine, the driven-side rotating body coaxially aligned with a rotation shaft core of the driving-side rotating body;
    a stopper defining a mechanical limit of a displacement region of a relative rotation phase between the driving-side rotating body and the driven-side rotating body;
    a three-phase energization electric motor;
    a phase control mechanism including a gear-type transmission structure, the phase control mechanism configured to be driven via the electric motor so as to set the relative rotation phase by controlling a rotation speed of the electric motor relative to a rotation speed of the driving-side rotating body;
    a phase sensor configured to detect the relative rotation phase as an actual phase; and
    a control unit configured to control the electric motor so as to displace the actual phase detected by the phase sensor in a direction toward a target phase, wherein:
    a limit phase at which the stopper reaches an abutting state is set in advance when rotation of the electric motor is stopped during operation of the internal combustion engine,
    upon executing a stop control of stopping the internal combustion engine, except when the actual phase is already the limit phase, the control unit executes a braking control of limiting the rotation of the electric motor, via control of an electric current supplied to the electric motor, and
    in the braking control, the control of the electric current supplied to the electric motor is performed by energizing only one of three phases of the electric motor.

2. The valve opening and closing timing control device according to claim 1, wherein:
    after starting the stop control, the control unit starts the braking control when the rotation speed of the driving-side rotating body has decreased below a set value.

3. The valve opening and closing timing control device according to claim 1, wherein:
    after starting the stop control, the control unit starts the braking control when a speed of abutting portions of the stopper has exceeded a set speed when the abutting portions collide with each other due to a torque acting from the camshaft.

4. The valve opening and closing timing control device according to claim 1, wherein:
    in the braking control, the rotation of the electric motor is stopped via the control of the electric current supplied to the electric motor, after starting the stop control.

5. A valve opening and closing timing control device, comprising:

a driving-side rotating body configured to rotate in synchronization with a crankshaft of an internal combustion engine;

a driven-side rotating body configured to rotate integrally with a camshaft of the internal combustion engine so as to open and close a valve in a combustion chamber of the internal combustion engine, the driven-side rotating body coaxially aligned with a rotation shaft core of the driving-side rotating body;

a stopper defining a mechanical limit of a displacement region of a relative rotation phase between the driving-side rotating body and the driven-side rotating body;

a phase control mechanism including a gear-type transmission structure, the phase control mechanism configured to be driven via an electric motor so as to set the relative rotation phase by controlling a rotation speed of the electric motor relative to a rotation speed of the driving-side rotating body;

a phase sensor configured to detect the relative rotation phase as an actual phase; and a control unit configured to control the electric motor so as to displace the actual phase toward a target phase, wherein:

a limit phase at which the stopper reaches an abutting state is set in advance when rotation of the electric motor is stopped during operation of the internal combustion engine, upon executing a stop control of stopping the internal combustion engine, except when the actual phase is already the limit phase, the control unit executes a braking control of limiting the rotation of the electric motor via control of an electric current supplied to the electric motor, and after starting the stop control, the control unit starts the braking control when a speed of abutting portions of the stopper has exceeded a set speed when the abutting portions collide with each other due to a torque acting from the camshaft.

\* \* \* \* \*